United States Patent Office

Re. 28,185
Reissued Oct. 1, 1974

28,185

ACIDIC SOLUTION OF PHENYLENEDIAMINE COLOR DEVELOPER AND SULFITE

Robert L. Bimmler and Roy J. Kanous, Rochester, N.Y., assignors to Eastman Kodak Company, Rochester, N.Y.

No Drawing. Original No. 3,615,572, dated Oct. 26, 1971, Ser. No. 676,623, Oct. 19, 1967. Application for reissue Jan. 18, 1973, Ser. No. 324,683
Int. Cl. G03c *5/30*
U.S. Cl. 96—66.4 11 Claims

Matter enclosed in heavy brackets [ ] appears in the original patent but forms no part of this reissue specification; matter printed in italics indicates the additions made by reissue.

ABSTRACT OF THE DISCLOSURE

The stability of acidic solutions of phenylenediamine compounds and sulfite is enhanced by controlling the phenylenediamine:sulfite ratio.

This invention relates to photographic developers. In one aspect this invention relates to photographic color developers and compositions and processes used in the production thereof, especially wherein the color developer components are prepackaged in solution form for ready mixing and use by the trade.

In the processing of photographic film and paper, wide varieties and large quantities of photographic developers are utilized. To facilitate the preparation and use of these developers, it had been found desirable to package the developers in liquid form usually as concentrates. However, some of the individual components of these developers, especially of color developers, react with one another and at the concentrations desired are not miscible. For these reasons the individual components have been conveniently packaged in separate compartments of a single package. In the separate compartments, the essential ingredients are more usefully either liquid per se or in solution so that mixing the ingredients into a complete developer involves no time consuming dissolution. The separate compartments have, for example, respectively contained benzyl alcohol, base plus buffering ingredients, hydroxylamine sulfate and an acidic solution of developing agent plus sulfite. We have unexpectedly found that even such extensive separation is not sufficiently effective when the packaged ingredients are stored for periods longer than a few months. Since shelf life instability is undesirable in such commercial packaged developers, investigation was undertaken to find methods and compositions which obviate or at least minimize the instability.

In prepackaged liquid developer compositions having separate compartments for keeping various essential ingredients from interacting, it has been considered necessary to put the sulfite required for the developer in solution with the developing agent, i.e., in the same compartment with the developing agent. This was done because sulfite was known to stabilize p-phenylenediamine silver halide developing agents. The mole ratio of sulfite to developing agent normally employed in such developer compositions ranges around 1.6:1. We have unexpectedly found that a reduction in the amount of sulfite which is compartmentalized in acidic solution with the developing agent in the prepackaged liquid developer results in a substantial increase in the storage stability of the packaged developer. Evidently, the sulfite in quantities normally employed, while retarding aerial oxidation, was promoting a degradation of the developing agent. When the degraded material was employed in developers used for processing color photographic materials, development of dyes occurred in nonimage areas, e.g., magenta dye appeared when only yellow should have. Since sulfite was considered necessary in the compartment with the developing agent to retard aerial oxidation, it is indeed surprising that sulfite has a detrimental effect on stability of such solutions when the solutions are stored for long periods of time or shorter periods of time at elevated temperatures.

In accordance with the present invention, it is especially desirable to incorporate in the acidic solution that amount of sulfite which is necessary to inhibit aerial oxidation of the developing agent but not so much as to promote a significant amount of developing agent degradation upon storage.

The minimum amount of sulfite useful in the acid solutions to retard aerial oxidation will vary somewhat depending inter alia upon the particular color developing agent in use since the p-phenylenediamines are oxidized at different rates, and upon the oxidizing agent such as air present in the solution. However, in the case of developing agent, 4-amino-N) - ethyl-N-[β-methanesulfonamidoethyl]-m-toluidine, especially useful results are obtained using more than about 0.08 mole of sulfite (e.g., about 10.1 g. sodium sulfite), i.e., the $SO_2$-containing moiety or moieties that are produced when various metallic (especially alkali metal) sulfites, bisulfites, sulfurous acid, etc. in combination or separately are added to water or water containing phenylenediamine developing agents and/or additional acid per mole of the developing agent (e.g., about 270 g. 4-amino-N-ethyl-N-[β-methanesulfonamidoethyl] - m - toluidine). Similar molar proportions of the other p-phenylenediamine color developing agents may be used. The acid developer compositions containing insufficient sulfite are usually colored by the oxidation products of the developing agent and alkaline color developing solutions made therefrom tend to produce colored images of low density and contrast.

As mentioned above, excessive amounts of sulfite in the acid solutions surprisingly have been found to cause degradation of the color developing agent. The maximum amount of sulfite desirable will also depend in part upon the particular color developing agent in use since the various p-phenylenediamines can be expected to be degraded at different rates. However, in the case of 4-amino-N-ethyl-N-[β-methanesulfonamidoethyl] - m - toluidine, less than about 1.50 moles of sulfite (e.g., about 189 g. sodium sulfite) per mole of developing agent (e.g., 270 g.) is advantageous.

It is noted that the amine-containing developing agents are referred to above as being free bases. Such amines are usually unstable in their free base form so they are commonly sold as salts. For example, 4-amino-N-ethyl-N-[β-methanesulfonamidoethyl] - m - toluidine is advantageously handled as a sesquisulfate monohydrate salt. It should be recognized however, that the amino-containing moiety is the group which effects development. For such compounds the mole ratios recited refer to the moles of amine as though the amine were in its free base state.

Similar molar ratios of the other p-phenylenediamine color developing agents also give improved stability. Accordingly, in the acid solutions, from about 0.08 to 1.50 moles of sulfite per mole of p-phenylenediamine developing agent is useful to retard aerial oxidation and degradation of the color-developing agent. For example, when sodium sulfite is used as the sulfite source and 4-amino - 3 - methyl-N-ethyl-N-[β-hydroxyethyl]-aniline sulfate is used as the developing agent the weight ratio advantageously employed ranges about from 0.1–1.8 grams sodium sulfite: 3 grams of this developing agent. However, when 4-amino - N - ethyl-N-[β-Methanesulfonamidoethyl] - m - toluidine sesquisulfate monohydrate (equivalent molecular weight approximately 423 is used, the weight ratio is about 0.1 to 1.8 grams sodium sulfite: 4.2 grams of this developing agent. The increase in stability is outstanding when the sulfite-developing agent mole ratio in acidic solution is about 0.08–1.0:1.0. The increase in stability is especially outstanding when the mole ratio is about 0.15–0.5:1.0.

The silver halide developing agents especially useful in the acidic sulfite-containing solution are the p-phenylenediamine color developing agents well known in the art especially those forming nondiffusing dyes with phenolic and reactive methylene couplers. These developing agents include p-phenylenediamine and N,N - dialkyl-p-phenylenediamines wherein the alkyl groups or the aromatic nucleus may be substituted, for example: N,N-diethyl-p-phenylenediamine monohydrochloride, 2 - amino - 5-diethylaminotoluene monohydrochloride, 4 - amino - N-ethyl-N-[β-methanesulfoamidoethyl] - m - toluidine sesquisulfate monohydrate, 4 - amino - 3 - methyl-N-ethyl-N-[β-hydroxyethyl]-aniline sulfate, 4 - amino - 3(β-methylsulfonamidoethyl) - N,N-diethylaniline hydrochloride, hydrochloride, 4 - amino - N,N-diethyl-3-(N'-methyl-β-methylsulfonamido) - aniline hydrochloride and similar color developing agents disclosed in U.S. Pat. Nos. 2,552,-241 and 2,566,271. Other useful p-phenylenediamine developing agents are disclosed in J.A.C.S. 73, 3100–3125, (1951). Especially effective p-phenylenediamines are those containing at least one alkylsulfonamidoalkyl substituent attached to the aromatic nucleus or to an amino nitrogen.

Also, it is important that the solution be acidic to assist in the stabilization of the developing agent and also to keep the developing agent in solution. The pH is preferably less than about 4. However, the optimum pH will vary depending upon the particular developing agent in use, for example, when 4-amino-N,N-diethyl - 3 - (N'-methyl - β-methylsulfonamidoethyl) - aniline hydrochloride is used, it is desirable that the solution have a pH less than 1 particularly to keep the developing agent in solution in a concentrate.

Other components can be prepackaged in the same compartment with sulfite and color developing agents, for example, other substances useful in the color development reaction may be present such as anitfoggants, e.g., benzotriazole, development restrainers, e.g., bromide and auxiliary black and white developing agents such as the 3-pyrazolidone silver halide developing agents, e.g., 4,4-dimethyl - 1 - phenyl-3-pyrazolidone. However, e.g., is usually desirable to only incorporate the two ingredients as a simple aqueous solution with or without added acid. The concentration of the sulfite and developing agent combined can vary widely. Since the developer package is designed for shipment and storage, it is usually desirable to utilize the highest concentration of ingredients which will readily stay in acidic solution. More dilute solutions can, of course, be utilized depending upon the individual circumstances.

The stabilization effect obtained by controlling the ingredient ratio as indicated above is generally advantageous in any acidic solution which contains both a p-phenylenediamine and sulfite. Maintaining the ratio is especially significant in photographic silver halide developer packages which are to be utilized with well known color products having differently sensitized silver halide emulsion layers containing nondiffusing coupler compounds. As described above, when a color product is used of the type having superposed on a support, blue, green and red sensitized emulsion layers containing yellow, magenta and cyan dye forming couplers, respectively, the mentioned degradation of the color developing agent in the presence of excess sulfite results, for example, in magenta dye appearing of the yellow color scale.

Similar results may be expected with a wide variety of color photographic elements which can be processed with the developers of this invention, i.e., multicolor systems containing superposed red, green and blue light-sensitive silver halide emulsion layers containing a cyan-forming coupler (e.g., a phenolic compound), a magenta-forming coupler (e.g., a 5-pyrazolone compound) and a yellow-forming coupler e.g., an open chain ketomethylene compound), respectively. Suitable nondiffusing couplers are disclosed in U.S. Pat. Nos. 2,956,876, 2,407,293, and 2,640,776.

The developer compositions when mixed and ready for use can and desirably do contain the usual amounts of developing agent, sulfite and alkali as disclosed generally in the Jelley et al. U.S. Pat. No. 2,322,027. According to this invention, packaged developer components must be separated to the extent that in compartments containing developing agents, the sulfite concentration and the pH is controlled as previously indicated. Other components which may form part of the mixed developer package, for example, additional sulfite, accelerators, complexing agents, buffers, e.g., citric acid-citrate, boric acid-borate, etc. are advantageously contained in the compartment containing the alkali, e.g., potassium hydroxide, although placing selected addenda in other or separate compartments may be desirable depending upon the particular ingredient chosen.

The packaged developed effectively may be a single package, for example, an outside container or cardboard box in which the developer components are compartmentalized. The compartments can be an integral part of the exterior packaging material but advantageously are, at least in part, merely bottles of, for example, glass and/or plastic enclosed in the outside container. The choice of sizes and shapes of the bottles which form the compartments can vary with the selected ingredients, concentrations desired, etc. Usually it is desirable to choose the bottle size, shape, etc. which will result in a total package of minimum size and weight to minimize shipping and storage costs. As a result, it may in some instances be desirable to place a single component type in a plurality of compartments, e.g., to conserve space.

The following examples are illustrative of the methods and compositions of our invention:

EXAMPLE 1—UNSTABLE PACKAGE

A developer kit containing separate bottles respectively containing:

A

| | | |
|---|---|---|
| Benzyl alcohol | cc | 12.6 |

B

| | | |
|---|---|---|
| Sodium hexametaphosphate | g | 2.0 |
| Sodium carbonate monohydrate | g | 26.8 |
| Sodium bicarbonate | g | 2.9 |
| Potassium bromide | g | 0.48 |
| Sodium chloride | g | 0.7 |
| Water | cc | About 60.0 |

C

| | | |
|---|---|---|
| Hydroxylamine sulfate | g | 2.1 |
| Water | cc | 6.0 |

D

| | | |
|---|---|---|
| Sodium sulfite (anhydrous) | g | 2.1 |
| Color developing agent* | g | 4.2 |
| Water | cc | About 13.0 |

*4-amino - N - ethyl-N-[β-methanesulfonamidoethyl]-m-toluidine sesquisulfate monohydrate is stored at room temperature for about 6 months or at elevated temperatures (e.g., 90°–120° F.) for shorter periods of time. The solutions are then added to sufficient water (about 70°–80° F.) to make one liter. The solution is then utilized as the developer for a photographic color print material having respectively superposed on a paper support, blue, green and red sensitized emulsion layers containing yellow, magenta and cyan dye-forming couplers respectively which has been exposed to a test pattern. After general processing of the photographic element using the developer mentioned above, the test pattern shows serious magenta contamination of the areas which should have appeared yellow.

EXAMPLE 2

A developer kit containing separate bottles respectively containing:

A

| | | |
|---|---|---|
| Benzyl alcohol | cc | 12.6 |

B

| | | |
|---|---|---|
| Sodium sulfite (anhydrous) | g | 1.9 |
| Sodium hexametaphosphate | g | 2.0 |
| Sodium carbonate monohydrate | g | 26.8 |
| Sodium bicarbonate | g | 2.9 |
| Potassium bromide | g | 0.48 |
| Sodium chloride | g | 0.7 |
| Water | cc | About 60.0 |

C

| | | |
|---|---|---|
| Hydroxylamine sulfate | g | 2.1 |
| Water | cc | About 6.0 |

D

| | | |
|---|---|---|
| Sodium sulfate (anhydrous) | | 0.2 |
| 4-amino-N-ethyl-N-[β-methane sulfonamidoethyl]-m-toludine sesquisulfate monohydrate | g | 4.2 |
| Water | cc | About 13.0 |

is stored at room temperature for about 6 months or at elevated temperatures (e.g., 900°–120° F.) for shorter periods of time. The liquids are then combined in the order indicated with sufficient water to make up about 1 liter at 70°–80° F., to make a complete developer. The developer is then used in the processing of an exposed color print material as in example 1. No detectable magenta contamination appears in the yellow areas.

The developer kit of example 2, Part B, can further be modified by replacing sodium hexametaphosphate by other calcium sequestering agents, such as amino polyacetic acids, e.g., diaminopropanol tetraacetic acid, ethylenediamine tetraacetic acid, nitrilo triacetic acid, etc., sodium carbonate can be replaced by alkali metal hydroxide with, e.g., boric acid added as a buffer.

EXAMPLE 3

A developer kit containing separate bottles respectively containing:

A

| | | |
|---|---|---|
| Benzyl alcohol | cc | 12.6 |

B

| | | |
|---|---|---|
| Sodium sulfite (anhydrous) | g | 1.9 |
| Sodium hexametaphosphate | g | 2.0 |
| Sodium carbonate monohydrate | g | 26.8 |
| Sodium bicarbonate | g | 2.9 |
| Potassium bromide | g | 0.48 |
| Sodium chloride | g | 0.7 |
| Water | cc | About 60.0 |

C

| | | |
|---|---|---|
| Hydroxylamine sulfate | g | 2.1 |
| Water | cc | 6.0 |

D

| | | |
|---|---|---|
| Sodium sulfite (anhydrous) | g | 0.2 |
| 2-amino-5-diethylaminotoluene monohydrochloride | g | 3.0 |
| Water | cc | About 13.0 |

is stored at room temperature for about 6 months or at elevated temperatures (e.g., 90°–120° F.) for shorter periods of time. The liquids are then combined with sufficient water to make up about 1 liter at 70°–80° F., to make a complete developer. The developer is then used in the processing of an exposed color print material as in example 1. No detectable magenta contamination appears in the yellow areas.

EXAMPLE 4

The procedure according to example 3 is followed except that 4-amino-3-methyl-N-ethyl-N-[β-hydroxyethyl]-aniline sulfate is utilized as the color-developing agent. No detectable magenta contamination appears in the yellow area.

EXAMPLE 5

The procedure according to example 3 is followed except that 4-amino-3-(β-methylsulfonamidoethyl)-N,N-diethylaniline hydrochloride is utilized as the color developing agent. No detectable magenta contamination appears in the yellow areas.

EXAMPLE 6

A developer kit containing separate bottles respectively containing:

A

| | | |
|---|---|---|
| Benzyl alcohol | cc | 12.6 |

B

| | | |
|---|---|---|
| Sodium sulfite | g | 1.7 |
| Sodium hexametaphosphate | g | 2.0 |
| Sodium carbonate monohydrate | g | 26.8 |
| Sodium bicarbonate | g | 2.9 |
| Potassium bromide | g | 0.48 |
| Sodium chloride | g | 0.7 |
| Water | cc | About 60.0 |

C

| | | |
|---|---|---|
| Hydroxylamine sulfate | g | 2.1 |
| Water | cc | 6.0 |

D

| | | |
|---|---|---|
| Sodium sulfite (anhydrous) | g | 0.4 |
| 4 - amino-N-ethyl-N-[β-methanesulfonamidoethyl]-m-toluidine sesquisulfate monohydrate | g | 4.2 |
| Water | g | About 13.0 |

is stored at room temperature for about six months. The liquids are then combined with sufficient water to make up about 1 liter at 70°–80° F., to make a complete developer. The developer is then used in the processing of an exposed color print material as in example 1. No detectable magenta contamination appears in the yellow areas.

EXAMPLE 7

The process of example 6 is carried out in the identical manner except using 0.6 g. of sodium sulfite in part D and 1.5 g. in part B. As a result, no detectable magenta contamination appears in the yellow areas.

EXAMPLE 8

The process of example 6 is carried out in the identical manner except using 0.8 g. of sodium sulfite in part D and 1.3 g. in part B. As a result, slight magenta contamination appears in the yellow areas but marked improvement over that of example 1.

EXAMPLE 9

The process of example 6 is carried out in the identical manner except using 1.0 g. of sodium sulfite in part D and 1.1 g. in part B. As a result, slight detectable magenta contamination appears in the yellow areas but marked improvement over that of example 1.

EXAMPLE 10

The process of example 6 is carried out in the identical manner except using 1.2 g. of sodium sulfite in part D and 0.9 g. in part B. As a result, slight detectable magenta contamination appears in the yellow areas but marked improvement over that of example 1.

EXAMPLE 11

The process of example 6 is carried out in the identical manner except using 1.4 g. of sodium sulfite in part D and 0.7 g. in part B. As a result, magenta contamination appears in the yellow areas but there is improvement over that of example 1.

EXAMPLE 12

The process of example 6 is carried out in the identical manner except using 1.6 g. of sodium sulfite in part D and 0.5 g. in part B. As a result, magenta contamination appears in the yellow areas but there is improvement over that of example 1.

EXAMPLE 13

The process of example 6 is carried out in the identical manner except using 1.8 g. of sodium sulfite in part D and 0.3 g. in part B. Magenta contamination appears in the yellow areas but there is improvement over that of example 1.

The invention has been described in detail with particular reference to preferred embodiments thereof, but it will be understood that variations and modifications can be effected within the spirit and scope of the invention as described hereinabove, and as defined in the appended claims.

We claim:

1. An acidic aqueous solution of pH less than about 4 comprising at least one *nuclear-substituted* phenylenediamine silver halide developing agent and an amount of sulfite sufficient to retard aerial oxidation of said developing agent and insufficient to cause significant degradation of said [latter] developing agent upon aging of said solution, the mole ratio of said developing agent to sulfite being [about] 1 to 0.08–[1.5] *0.5*.

2. The solution of claim 1 wherein the aqueous solution contains at least one *nuclear-substituted* N,N-diakyl-p-phenylenediamine silver halide developing agent.

3. The solution of claim 2 wherein at least one *nuclear-substituted* N,N-dialkyl-p-phenylenediamine silver halide developing agent contains an alkylsulfonamido group.

4. The composition of claim 2 wherein the developing agent is at least one developing agent selected from the group consisting of [N,N-diethyl-p-phenylenediamine,] 2-amino-5-diethylaminotoluene, 4-amino-N-ethyl-N-(β-methane-sulfonamidoethyl)-m-toluidine, 4-amino-3-methyl-N-ethyl-N-(β-hydroxyethyl)-aniline, 4-amino-3-(β-methylsulfonamidoethyl)-N,N-diethylaniline, or 4-amino-N,N-diethyl-3-(N'-methyl-β-methylsulfonamidoethyl)-aniline or salts thereof.

5. An acidic aqueous solution as in claim 4 wherein the p-phenylenediamine developing [agent-sulfite mole ratio is about 1:0.08–1.0.] *agent is 4-amino-N-ethyl-N-(β-methanesulfonamidoethyl) - m - toluidine sesquisulfate monohydrate.*

6. An acidic aqueous solution as in claim [5] *4* wherein the p-phenylenediamine developing agent-sulfite mole ratio is [about] 1:0.15–0.5.

7. A method for the production of a photographic silver halide developer composition comprising combining (1) an acidic aqueous solution *of* pH less than about 4 comprising *a nuclear-substituted* p-phenylenediamine developing agent and sulfite in a mole ratio of [about] 1:0.08–[1.5] *0.5* with (2) an alkaline aqueous solution to obtain a solution having a pH substantially greater than 7.

8. A method as in claim 7 wherein at least one *nuclear-substituted* p-phenylenediamine developing agent is a *nuclear-substituted* dialkylaminoaniline.

*9. The solution of claim 1 wherein the nuclear-substituted phenylenediamine silver halide developing agent is substituted in at least one of the nuclear positions thereof with an alkyl group.*

*10. The solution of claim 1 wherein the nuclear-substituted phenylenediamine silver halide developing agent is substituted in at least one of the nuclear positions thereof with an alkylsulfonamidoalkyl group.*

*11. The solution of claim 1 wherein the nuclear-substituted phenylenediamine silver halide developing agent is substituted in at least one of the nuclear positions thereof with a methyl group.*

References Cited

The following references, cited by the Examiner, are of record in the patented file of this patent or the original patent.

UNITED STATES PATENTS

| | | | |
|---|---|---|---|
| 1,969,243 | 8/1934 | Trumbull | 96—66.1 |
| 2,506,623 | 5/1950 | Tull | 96—66.4 |
| 2,845,349 | 7/1958 | Schwarz | 96—66.1 |
| 2,875,049 | 2/1959 | Kridel | 96—66.4 |
| 3,335,004 | 8/1967 | Wrisley | 96—66 |

OTHER REFERENCES

Mason, 1966 Photographic Processing, chemistry, pp. 221–223.

MARY F. KELLEY, Primary Examiner

U.S. Cl. X.R.

96—66 R, 66.1